UNITED STATES PATENT OFFICE.

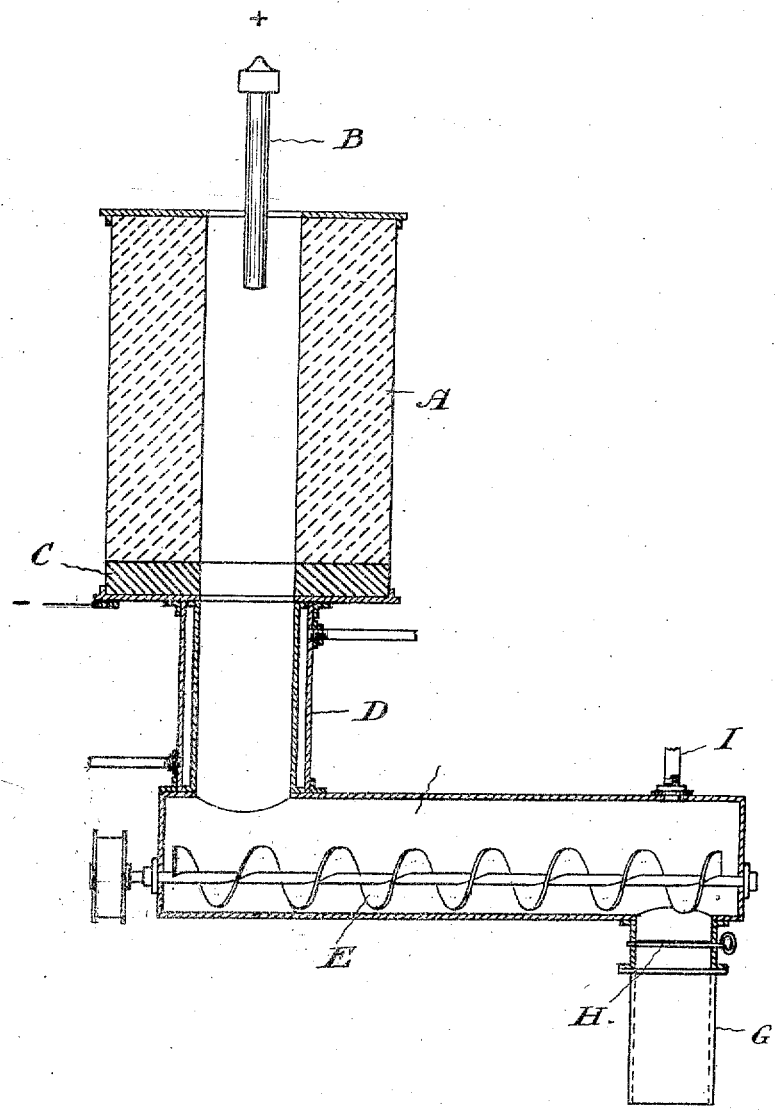

ALEXANDER BONNINGTON AND HARRY G. AKERS, OF TORONTO, ONTARIO, CANADA.

PROCESS OF PRODUCING CALCIUM CYANAMID.

1,021,445.  Specification of Letters Patent.  Patented Mar. 26, 1912.

Application filed February 16, 1911. Serial No. 608,996.

*To all whom it may concern:*

Be it known that we, ALEXANDER BONNINGTON and HARRY G. AKERS, of the city of Toronto, in the Province of Ontario, Canada, have invented certain new and useful Improvements in Direct Processes of Producing Calcium Cyanamid, of which the following is a specification.

This invention relates to the direct production of calcium cyanamid and our object is to devise a cheap and efficient direct process which will result in the formation of the cyanamid practically free from carbid as an end product.

The process is based on the following reactions:—

1. $CaCO_3 + 2C + N_2 = CaCN_2 + CO_2 + CO$.
2. $CaO + 2C + N_2 = CaCN_2 + CO$.
3. $CaC_2 + N_2 = CaCN_2 + C$.

that is to say that in carrying out the process the calcium cyanamid is formed by taking proper quantities of calcium carbonate or an equivalent calcium compound carbon in a suitable form and a catalytic agent, intimately mixed together with a suitable binder, and heating them together to the temperature of reaction in the presence of nitrogen and then allowing the mass to cool in the presence of nitrogen.

The cyanamid may be formed directly as in Formula 1 or 2 or calcium carbid may be formed, which, by a further reaction as in Formula 3, unites with the nitrogen releasing carbon.

The fundamental features of our process lie in so preparing and treating the mixed materials employed before subjecting the mixture to the temperature of re-action, that a porous mass will be produced which is readily permeable by the nitrogen employed, in the use of the catalytic agent to reduce the temperature of re-action and in the final treatment of the porous mixture in a furnace in which the process of manufacture may be continuous.

*Mixture.*—In the mixture we employ calcium carbonate $CaCO_3$ or its chemical equivalent, such as calcium oxid $CaO$ or calcium hydrate $Ca(OH)_2$, although at present calcium carbonate seems to be the most suitable. The carbon employed is preferably in the form of coke, though other forms of carbon such as coal, graphite, amorphous carbon, oil coke or charcoal, may be employed. The catalytic agent employed may be either calcium fluorid ($CaF_2$), calcium chlorid ($CaCl_2$) metallic iron iron oxid or other suitable substance though the calcium fluorid, calcium chlorid or a mixture of both is deemed preferable. The binder employed may be pitch, tar, sugar residues or the like, or even inorganic compounds having a melting point lower than the calcium carbonate or oxid employed. Calcium aluminate is an example of such a binder. Calcium chlorid or fluorid also have an action as a binder and may thus have value in this capacity as well as a catalytic agent. The calcium carbonate, or its equivalent, the coke or its equivalent, and the catalytic agent, are finely ground, and suitable quantities are taken and intimately mixed with the binder, preferably pitch or tar. Some water may also be employed if considered necessary. The mixed material is then coked in any suitable coking furnace, being baked or heated to a temperature below that of reaction but sufficient to carbonize the binder. This preliminary coking leaves the mass in a hard porous condition in which it is readily permeable by the nitrogen introduced in the later stages of the process. The production of this porous mass is due partly to the carbonizing of the binder and partly, if calcium carbonate be employed, to the driving off of carbon dioxid from the carbonate. This porous charge is now subjected to intense heat, preferably such as that obtainable through the use of an electric furnace, though the temperature is preferably kept below that at which calcium carbid is ordinarily formed and preferably in the neighborhood of 1600° C.

The form of furnace preferably to be employed is that in which the charge may be continuously passed through the heated zone so that after a portion of the charge has been heated to cause the reaction, it passes on to a cooler zone. The drawing illustrates a suitable furnace for the purpose.

A is the body of the furnace formed of suitable refractory materials. The chamber of the furnace is of comparatively small diameter relative to its length, and in the upper end is inserted an electrode B. The second electrode C is preferably ring shaped and located at the lower end of the furnace chamber A'. The lower end of the furnace communicates with the water jacketed chamber D which discharges into the chamber of the screw conveyer E which feeds to the discharge pipe G. The discharge is preferably controlled by a pivoted valve H. The porous roasted material is fed into the upper end of the furnace, passes down through the heated zone and after the reaction has taken place gradually cools and is discharged from the discharge pipe G. Nitrogen may be introduced through the opening I. Nitrogen is passed through the mass both while it is passing and after it has passed the heated zone resulting in reaction taking place according to formulæ 1, 2 or 3, hereinbefore set out. The result is that as an end product we obtain calcium cyanamid practically free from calcium carbid, but containing of course the catalytic agent employed which, however, is not objectionable.

The advantages of our process are numerous. In the first place, it is a direct and continuous process and does not require the preliminary formation of calcium carbid and its subsequent treatment to produce the cyanamid. A second great advantage is that the cyanamid is produced practically free from carbid.

The success of the process depends, first, on the forming of the charge as a spongy mass and the maintenance of this condition to the end of the process in order to permit of the nitrogen thoroughly and completely permeating the mass during such time as reaction takes place; and second, from the use of the catalytic agent which makes it feasible to carry the reaction on at a lower temperature than would otherwise be the case, thus tending to prevent the formation of carbid and which further acts by keeping the mass porous and by conducting the heat through the charge.

What we claim as our invention is:—

1. A direct process of manufacturing calcium cyanamid which consists in first forming a porous mass containing in intimate admixture calcium in combination, and carbon; and then heating said mixture to a suitable temperature; and passing nitrogen through the mass.

2. A direct process of manufacturing calcium cyanamid which consists in first forming a porous mass containing, in intimate admixture calcium carbonate, and carbon; and then heating said mixture to a suitable temperature, and passing nitrogen through the mass.

3. A direct process of manufacturing calcium cyanamid which consists in forming a porous mass containing, in intimate admixture, calcium carbonate and carbon; passing said mixture through a heated zone in a furnace in which re-action takes place; passing nitrogen through the heated mass and allowing the mass to cool in the presence of the nitrogen.

4. A direct process of manufacturing calcium cyanamid which consists in forming a porous mass containing, in intimate admixture, calcium carbonate, a catalytic agent and carbon; passing said mixture through a heated zone in a furnace in which reaction takes place; introducing nitrogen into the mass and allowing the mass to cool in the presence of the nitrogen.

5. A direct process of manufacturing calcium cyanamid which consists in forming a porous mass containing, in intimate admixture, calcium carbonate, calcium fluorid, and carbon; passing said mixture through a heated zone in a furnace in which reaction takes place; introducing nitrogen into the mass and allowing the mass to cool in the presence of the nitrogen.

6. A direct process of manufacturing calcium cyanamid which consists in mixing together calcium carbonate, carbon and a binder; baking the mixture to obtain a hard porous mass, passing the baked mixture through a heated zone in a furnace in which re-action takes place; and at the same time passing nitrogen through the mass.

7. A direct process of manufacturing calcium cyanamid which consists in mixing together calcium carbonate, carbon, a catalytic agent and a binder; baking the mixture to obtain a hard porous mass; passing the baked mixture through a heated zone in a furnace in which re-action takes place; and at the same time passing nitrogen through the mass.

8. A direct process of manufacturing calcium cyanamid which consists in first baking a mixture of calcium carbonate, carbon and a binder; and then heating said mixture to a suitable temperature; and at the same time passing nitrogen through the mass.

9. A direct process of manufacturing calcium cyanamid which consists in first baking a mixture of calcium carbonate, carbon, a catalytic agent and a binder; and then heating said mixture to a suitable temperature; and at the same time passing nitrogen through the mass.

Toronto this 9th day of Feb. 1911.

ALEXANDER BONNINGTON.
HARRY G. AKERS.

Signed in the presence of—
J. Edw. Maybee,
E. P. Hall.